United States Patent
Snow et al.

(10) Patent No.: US 8,494,898 B2
(45) Date of Patent: Jul. 23, 2013

(54) CAMPAIGN MANAGEMENT OF DIRECT MAIL

(71) Applicant: Xerox Corporation, Norwalk, CT (US)

(72) Inventors: Lewis S. Snow, La Crescenta, CA (US); Arazik Khachatrian, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/670,706

(22) Filed: Nov. 7, 2012

(65) Prior Publication Data
US 2013/0066671 A1 Mar. 14, 2013

Related U.S. Application Data

(62) Division of application No. 12/427,001, filed on Apr. 21, 2009, now Pat. No. 8,341,001.

(51) Int. Cl.
*G06Q 99/00* (2006.01)

(52) U.S. Cl.
USPC ....... 705/7.35; 705/7.27; 705/7.29; 705/7.31; 705/7.36

(58) Field of Classification Search
USPC .................. 705/7.35, 7.27, 7.29, 7.31, 7.36
See application file for complete search history.

(56) References Cited

U.S. PATENT DOCUMENTS

| | | |
|---|---|---|
| 6,260,024 B1 | 7/2001 | Shkedy |
| 6,397,197 B1 | 5/2002 | Gindlesperger |
| 7,346,571 B1 | 3/2008 | Fujita |
| 2003/0069824 A1 | 4/2003 | Menninger |
| 2004/0078277 A1 | 4/2004 | Gindlesperger |
| 2004/0107127 A1 | 6/2004 | Kanzinger et al. |
| 2005/0204283 A1 | 9/2005 | Kroeger |
| 2005/0234811 A1 | 10/2005 | Herman et al. |
| 2007/0233510 A1 | 10/2007 | Howes |
| 2008/0183596 A1 | 7/2008 | Nash et al. |
| 2009/0055272 A1 | 2/2009 | Numaoka et al. |
| 2009/0281878 A1 | 11/2009 | Rane et al. |

OTHER PUBLICATIONS

Microsoft Office Online, "Create Better Meeting Handouts", http://office.microsoft.com/enus/powerpoint/HA012111521033.aspx?mode=print t pp. 1-5, Dec. 3, 2008.
Microsoft Office Online, "About Handouts", http://office.microsoft.com/en-us/ powerpoint/HP030765641033.aspx?mode=print, pp. 1-2, Dec. 3, 2008.
U.S. Patent Office Communication, U.S. Appl. No. 12/427,001 Dated Oct. 6, 2011, pp. 1-6.

(Continued)

*Primary Examiner* — Akiba Allen
(74) *Attorney, Agent, or Firm* — Gibb & Riley, LLC (57) ABSTRACT

A machine-implemented method receives job specifications for a plurality of direct mail printing jobs from a user and automatically groups the multiple direct mail printing jobs into at least one campaign, using a computerized or processor-based machine. The machine automatically creates a plurality of workflows related to direct mail printing jobs within a campaign and transmits requests for bids on these job activities to entities (e.g., supply vendors) to allow the entities to bid on performing the job activities. The machine automatically selects winning bids on an individual job activity-by job activity basis from the bids received from the entities and combines the bids to provide cost and completion estimates for each of the workflows. The machine automatically combines estimates for the workflows to produce an overall estimate for the campaign. The overall estimate for the campaign is output to the user for review and approval.

20 Claims, 9 Drawing Sheets

OTHER PUBLICATIONS

U.S. Patent Office Communication, U.S. Appl. No. 12/427,001 Dated Dec. 16, 2011, pp. 1-27.
U.S. Patent Office Communication, U.S. Appl. No. 12/427,001 Dated May 22, 2012 pp. 1-26.
U.S. Patent Office Communication, U.S. Appl. No. 12/427,001 Dated Aug. 16, 2012, pp. 1-18.
U.S. Patent Office Communication, U.S. Appl. No. 12/426,978 Dated Oct. 7, 2011, pp. 1-6.
U.S. Patent Office Communication, U.S. Appl. No. 12/426,978 Dated Dec. 14, 2011, pp. 1-24.
U.S. Patent Office Communication, U.S. Appl. No. 12/426,978 Dated May 21, 2012, pp. 1-25.
U.S. Patent Office Communication, U.S. Appl. No. 12/426,978 Dated Aug. 20, 2012, pp. 1-13.

FIG. 3 xerox | Xerox MarketPort®

HOME | NEW JOBS | JOB STATUS | TEMPLATES | VENDORS | REPORT

JOB
- Campaign Detail

Direct Mail Job
New Test Campaign Lew

Campaign Detail

Campaign Details — Modify

| | | | |
|---|---|---|---|
| Marketport Campaign ID | 77865 | Agency | |
| Campaign Name | New Test Campaign Lew | Postage WBS Level | 0 |
| Quantities | 50000 | Security Controlled Mailing | No |
| Category | Direct Mail Job | | |
| Subcategory | Direct Mail Job | 100% Spoils Recovery | No |
| Job Description | tsered | Bid Due Date | 1-Aug-2008 05:00PM |
| Special Instructions | | Delivery Due Date | 13-Mar-2010 05:00PM |
| Campaign Manager | kdkdkfs | Artwork Due Date | |
| DAO Job # | 08134 | Release to Royal MailFrom | |
| Document Advisor | dfsfsdf | Release to Royal MailTo | |

Associated Jobs

| Job Id | Type | Component | Job Description | Job Status | Price | Vendor |
|---|---|---|---|---|---|---|
| 35467 | Open Item | Default PersonalizeComp1 1 | tsered | Incomplete | | |
| 35468 | DM.Personalization | MailPrepComp1 1 FinishingComp1 1 | tsered | Incomplete | | |
| 35469 | DM Forms | Select Type | tsered | Incomplete | | |
| 35470 | DM ListProcessing | Amar Component 1 | tsered | Incomplete | | |

CAMPAIGN MANAGEMENT OF DIRECT MAIL

CROSS-REFERENCE TO RELATED APPLICATIONS

This application is a divisional of U.S. application Ser. No. 12/427,001 filed Apr. 21, 2009, which issued on Dec. 25, 2012 as U.S. Pat. No. 8,341,001, the complete disclosure of which, in its entirety, is herein incorporated by reference.

This application is also related to pending U.S. patent application Ser. No. 12/426,978, filed Apr. 21, 2009 to Lewis S. Snow et al., entitled "Automated Direct Mail Procurement System," assigned to the present assignee, and is incorporated herein by reference.

BACKGROUND AND SUMMARY

Embodiments herein generally relate to electrostatic printers and copiers or reproduction machines, and more particularly, concerns a campaign management system and method for managing multiple direct mail jobs.

During 2007 marketers in the U.S. spent total of $55.3 billion in direct mail, driving $686.7 billion in sales. By 2012, it is anticipated that American business will spend $61.7 billion on direct mail. In comparison $1.2 billion will be spent on e-mail marketing and $39.7 billion will be spent on Internet (non-e-mail) marketing. In 2012, 27% of marketing budgets will be allocated to direct mail.

The embodiments herein offer reverse auctioning tools for print procurement, which allow print vendors to generate savings for customers by selecting and awarding print jobs to supply vendors who offer lowest pricing and optimum production methods, based upon contractual rates (and capability) submitted by the supply vendors. By including direct mail in the total print volume they procure, print vendors will be able to increase the savings they can offer to their customers. Also, by allowing print procurement potentially without rate cards, print vendors will have the option of working with supply vendors who do not want to submit or negotiate direct mail pricing through rate cards.

More specifically, embodiments herein include a machine-implemented method that receives job specifications for a plurality of direct mail printing jobs from at least one user and automatically groups the multiple direct mail printing jobs into at least one campaign, using a computerized or processor-based machine. The machine automatically creates a plurality of workflows related to direct mail printing jobs within a campaign. Each of the workflows comprises at least one job activity.

The machine automatically transmits requests for bids on these job activities within the workflow to entities (e.g., supply vendors) to allow the entities to bid on performing the job activities. In response, the machine will receive bids on the job activities from the entities. In addition, the machine may receive user bid selection. The machine automatically selects winning bids on an individual job activity-by job activity basis from the bids received from the entities and/or previously established rate cards of the entities. In addition, winning bid recommendations from the machine can be combined with user input to select the ultimate winning bids.

The machine automatically combines the bids to provide cost and completion estimates for each of the workflows and the machine automatically combines estimates for the workflows to produce an overall estimate for the campaign. The overall estimate for the campaign is output to the user for review and approval. In response, the machine receives campaign modification input from the user and modifies the campaign according to the campaign modification input (through at least one iteration). The machine then performs the workflows to output the direct-mail printing jobs within the campaign.

The workflows comprise at least one of form workflows, list processing workflows, personalization workflows, open workflows, etc. The list processing workflows and the personalization workflows have multiple components as part of the job specifications. The list processing workflows have lists of direct mail recipients to process. The personalization workflows have a plurality of personalization, mail preparation, and finishing components.

More specifically, regarding each of the individual and job activities within each of the workflows, the form workflows comprise at least one of prepress activities, press activities, inline operation activities, ink supply activities, paper supply activities, etc. The list processing workflows comprise at least one of list processing setup activities, file preparation activities, file manipulation activities, postal pre-sorting activities, suppression activities, processing and output activities, custom programming activities, electronic output activities, etc. The personalization workflows comprise at least one of personalization preparation activities, image digitalization activities, text preparation activities, personalization proofing activities, ink jet imaging activities, laser imaging activities, scitex imaging activities, burst/trim/folding activities, inserting activities, stacking activities, card affixing activities, cut sheet folding activities, cut sheet trimming activities, gluing activities, die cutting activities, die manufacture activities, match mailing activities, packed proofing activities, labeling activities, mailing security activities, spoils recovery activities, sorting activities, postage affixing activities, electronic production (EPRO) activities, etc. The open item workflows comprise at least one of digital print activities, commercial print activities, envelope activities, label activities, custom activities, etc. With embodiments herein, bids are received for each of the foregoing activities and the embodiments herein select each bid on an individual job activity-by job activity basis from among all of the foregoing activities.

Apparatus embodiments herein include a computer storage media storing instructions and a processor operatively connected to the computer storage media, that performs the instructions. In addition, a graphic user interface, input-output, etc., is/are operatively connected to the processor. The graphic user interface and/or input-output receives job specifications for a plurality of direct mail printing jobs from at least one user.

The processor automatically groups the direct mail printing jobs into at least one campaign and the processor automatically creates a plurality of workflows related to direct mail printing jobs within a campaign. Again, each of the workflows comprises at least one job activity.

The input-output automatically transmits requests for bids on the job activities within the workflow to entities to allow the entities to bid on performing the job activities, and the input-output receives bids on the job activities from the entities. The graphic user interface can receive user bid selection and/or the processor can automatically select winning bids on an individual job activity-by job activity basis from the bids received from the entities and/or previously established rate cards of the entities.

The processor automatically combines the bids to provide cost and completion estimates for each of the workflows and combines the estimates for the workflows as an overall estimate for the campaign. The graphic user interface outputs the overall estimate for the campaign to the user and, in response, can receive campaign modification input from the user in response. The processor can modify the campaign according to the campaign modification input (through at least one iteration). Finally, the processor performs the workflows to output, through the input-output, the direct-mail printing jobs within the campaign.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

The embodiments herein provide an extension to existing systems by offering a campaign management mode for procuring and managing multiple direct mail jobs. A campaign is a grouping or container of multiple direct mail jobs. The campaign provided herein allows users of the software to better understand the relationship among multiple direct mail jobs. It also allows users to procure individual jobs within the campaign amongst a wider field of specialized suppliers.

This functionality of embodiments herein allows print vendors (on-site printing service personnel) to include direct mail in the total print volume of jobs they process. This will increase savings for their customers as well as generate additional revenues for those clients tied to a fee structure based upon procurement volume.

The print procurement process for direct mail is significantly different from commercial print procurement. This difference is due not only to the equipment used in direct mail facilities but also to direct mail specific tasks which have no analog in commercial printing (list processing, mail preparation, etc.).

While direct mail procurement falls within the genus of commercial print it is definitely a unique species. Direct mail offset printing presses have interchangeable press cylinders, introducing a huge variability factor not seen in the commercial print procurement. Press output is also variable in the direct mail arena and is dependent upon subsequent personalization modality. Neither of these two important manufacturing factors is found in commercial printing.

The embodiments herein work with unique services required to process and manipulate raw data to create mailing lists suitable for input into personalization devices and distribution into the mail stream; unique services required to image (personalize) pre-printed masters using a number of unique imaging options; unique services required to transform personalized product from masters into individualized items ready for distribution; and unique services required to prepare individualized items for the mail stream or other distribution.

Once the buyer enters job specifications a list of supply vendors capable of producing the job is created and a preview price is calculated based on the rates collected during the sourcing effort. A sourcing effort is not a simple task. A common effort to source commercial print and direct mail can take as long as nine months, involve dozens of support individuals, and elicit initial participation from nearly 300 potential suppliers. After reviewing submittals the list of potential suppliers is culled. Those remaining engage in entering over 2,000 pricepoints into a database (commonly referred to as an "ASW" or "Advanced Sourcing Workbench"). Those entries are analyzed by sourcing consultants and the list is further culled. Interaction among the consultants and remaining suppliers results in review and adjustment of pricepoints. In the end a select grouping of suppliers is chosen to become providers and to establish rate cards.

If rate cards do not exist for a customer's job, or if requests do not fit within the predetermined specifications, jobs can still be submitted to selected supply vendors for bidding via an open item process of embodiments herein. The open item process can be used for items ranging from CD/DVD duplication, to wide format digital print, to envelopes, to promotional giveaways, etc. In the direct mail module of embodiments herein commercial print jobs can be included in a direct mail campaign through use of the open items functionality. Optimal prices for all open item jobs are achieved through the bidding process.

Once the print vendor has created the job specification and submitted it to the selected supply vendors, the bidding process starts and obtains the best possible price for the specification using the campaign management modality discussed herein.

Figure 1:
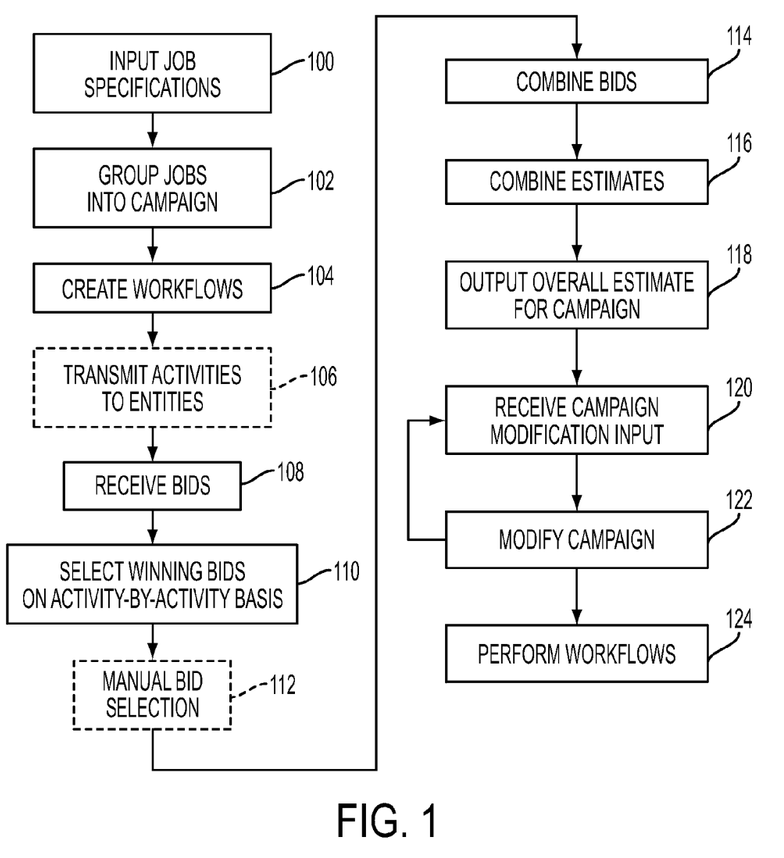
FIG. 1 is a flowchart illustrating embodiments herein.

FIG. 1 is a flowchart illustrating the campaign modality, which is a machine-implemented method. In item 100, job specifications for a plurality of direct mail printing jobs are input into a computerized machine (having at least one processor and a storage medium) from a user (e.g., print vendor). The different direct mail printing jobs can come from multiple clients and can be completely unrelated to one another. The print vendor accumulates such direct mail printing jobs from one or more clients.

In item 102, the embodiments herein automatically group the multiple direct mail printing jobs into at least one campaign, using the computerized or processor-based machine. Then, in item 104, the machine automatically creates a plurality of workflows related to direct mail printing jobs within the campaign. Each of the workflows comprises at least one job activity.

The machine automatically transmits requests for bids on these job activities to entities (e.g., supply vendors) in item 106 to allow the entities to bid on performing the job activities. In response, the machine will receive bids on the job activities from the entities in item 108. Alternatively, the bids can be based on pre-established rate cards and the solicitation of bids in item 106 can be entirely or partially omitted. If item 106 is omitted, the receiving of the bids (in item 108) comprises receiving the bids from those maintained as rate cards within the computer storage medium of the machine. The machine automatically selects winning bids on an individual job activity-by job activity basis from the bids received from the entities and/or previously established rate cards of the entities in item 110. In addition, the machine may receive manual user bid selection, which can override the automatic selection (shown as item 112).

The machine automatically combines the bids to provide cost and completion estimates for each of the workflows in item 114, and the machine automatically combines estimates for the workflows (item 116) to produce an overall estimate for the campaign.

The overall estimate for the campaign is output to the user for review and approval in item 118. In response, the machine receives campaign modification input from the user (item 120) and modifies the campaign according to the campaign modification input (through one or more iterations) in item 122. The machine then performs the workflows to output the direct-mail printing jobs within the campaign in item 124.

The workflows comprise at least one of form workflows, list processing workflows, personalization workflows, open workflows, etc., as explained in greater detail below. The list processing workflows and the personalization workflows have multiple components as part of the job specifications. The list processing workflows have lists of direct mail recipients to process. The personalization workflows have a plurality of personalization, mail preparation, and finishing components.

More specifically, regarding each of the individual and job activities within each of the workflows, the form workflows comprise at least one of prepress activities, press activities, inline operation activities, ink supply activities, paper supply activities, etc. The list processing workflows comprise at least one of list processing setup activities, file preparation activities, file manipulation activities, postal pre-sorting activities, suppression activities, processing and output activities, custom programming activities, electronic output activities, etc. The personalization workflows comprise at least one of personalization preparation activities, image digitalization activities, text preparation activities, personalization proofing activities, ink jet imaging activities, laser imaging activities, scitex imaging activities, burst/trim/folding activities, inserting activities, stacking activities, card affixing activities, cut sheet folding activities, cut sheet trimming activities, gluing activities, die cutting activities, die manufacture activities, match mailing activities, packed proofing activities, labeling activities, mailing security activities, spoils recovery activities, sorting activities, postage affixing activities, electronic production (EPRO) activities, etc. The open item workflows comprise at least one of digital print activities, commercial print activities, envelope activities, label activities, custom activities, etc.

With embodiments herein, bids are received for each of the foregoing activities and the embodiments herein select each bid on an individual job activity-by job activity basis from among all of the foregoing activities. This allows the computerized device and the print vendor to pick and choose to have different activities performed by different supply vendors depending upon which activity of each workflow the supply vendor has the lowest cost. In other words, rather than selecting whether or not a supply vendor should perform the entire workflow, the embodiments herein select from individually bid activities. With embodiments herein, a certain vendor may perform only a portion of a given workflow (that portion of the workflow that the vendor performs most economically) and other vendors would perform the remaining portions of that workflow. This allows the present embodiments to very efficiently select the best supply vendor for each individual activity to lower overall cost.

Figure 2:
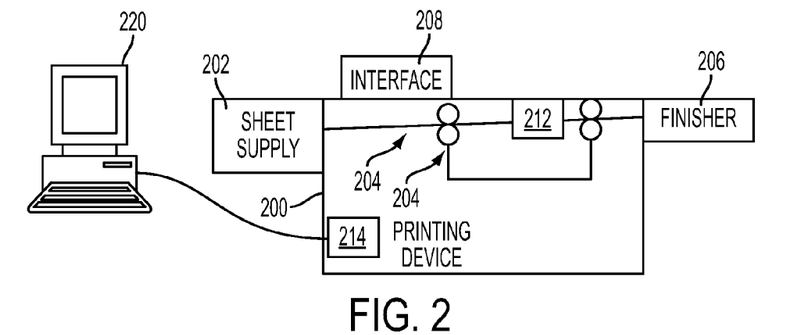
FIG. 2 is a schematic diagram of printer and computer system according to embodiments herein.

The embodiments herein further comprise system and apparatus embodiments. One such embodiment is illustrated in FIG. 2. This apparatus embodiment is illustrated as a printing device 200, and computer or network device 220. More specifically, FIG. 2 illustrates a printing apparatus 200 that includes a printing engine 212 (e.g., an electrostatic and xerographic printing engine) and a media path 204. The media path 204 transports sheets of print media to and from (relative to) the printing engine 212 (e.g., from a sheet supply 202, through the printing engine 212, and finally to a finisher 206). The media path 204 can include belts, rollers, or any other mechanism for moving media sheets.

Item 208 illustrates a user interface, item 210 represents the processor (central processing unit (CPU)) or controller, and item 214 represents an input-output device such as a wired or wireless connection to any form of network or other device. The controller 210 is a computerized device and includes at least one computer storage media that stores instructions that the controller 210 executes to control the operations of the various components within the printer 200. The controller 210 can be connected to the sensors, drive rollers, registrations units, etc., and causes the actions described herein to occur.

The word "printer" or "printing device" as used herein encompasses any apparatus, such as a digital copier, bookmaking machine, facsimile machine, multi-function machine, etc. which performs a print outputting function for any purpose. The details of printers, printing engines, etc. are well known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

The computer/network device 220 comprises any commonly available computing device that includes a graphic user interface, user input devices, computer memory (storage media), processor, power supplies, cooling units, etc. Many computerized devices are discussed herein. Computerized devices that include chip-based central processing units (CPU's), input-output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input-output devices, power supplies, processors, electronic storage media memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

Figure 3:
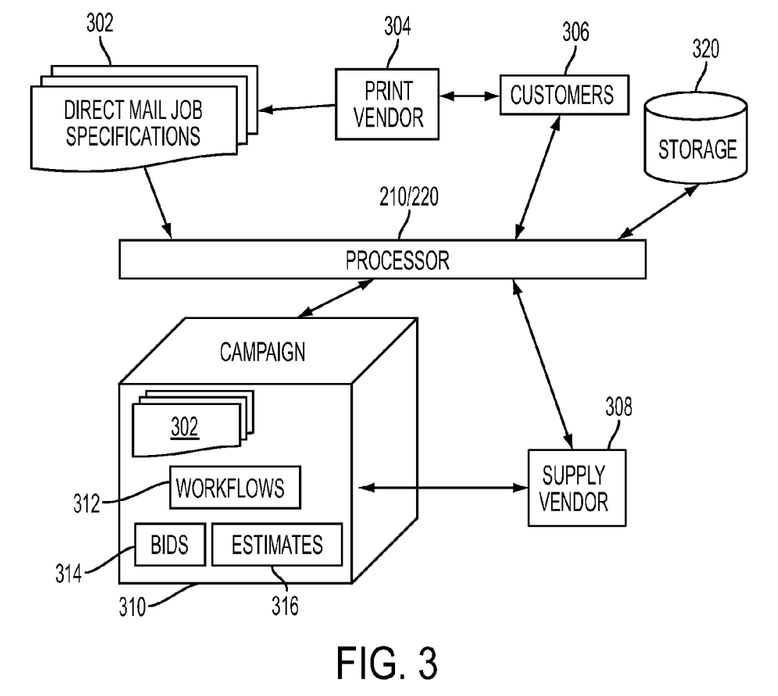
FIG. 3 is a schematic diagram illustrating the flow of various aspects of embodiments herein.

As shown in FIGS. 2 and 3, the graphic user interface 208 and/or input-output 214 receive job specifications 302 for a plurality of direct mail printing jobs from a user 304 (e.g., print vendor) based on jobs 302 received from customers 306. The processor 210/220 automatically groups the direct mail printing jobs 302 into at least one campaign 310 and the processor 210/220 automatically creates a plurality of workflows 312 related to direct mail printing jobs 302 within a campaign 310. Again, each of the workflows 312 comprises at least one job activity.

The input-output 214 automatically transmits requests for bids on the job activities within the workflow to entities (supply vendors 308) to allow the entities 308 to bid on performing the job activities, and the input-output 214 receives bids on the job activities from the entities 308. As mentioned above, some supply vendors can store rate cards for various job activities in the computer storage medium 320, which can omit the need to solicit bids from supply vendors for every job activity. Therefore, the bids 314 can be a mixture of rate card bids and vendor supplied the bids. The processor 210/220 can automatically select winning bids on an individual job activity-by job activity basis from the bids received from the entities and/or previously established rate cards of the entities 308 and/or the graphic user interface 208/220 can receive user bid selection/modification.

The processor 210/220 automatically combines the bids 314 to provide cost and completion estimates 316 for each of the workflows 312 and combines the estimates 316 for the workflows 312 as an overall estimate 316 for the campaign 310. The graphic user interface 208/220 outputs the overall estimate 316 for the campaign 310 to the user 304 and, in response, can receive campaign modification input from the user 304 in response. The processor 210/220 can modify the campaign 312 according to the campaign modification input (through iterations, if necessary). Finally, the processor 210/220 performs the workflows 312 to output through, for example, the printing device 200 shown in FIG. 2, or by communicating with the supply vendors who had the winning bids and who can operate any device, such as printing device 200. The final output is printed material that is mailed to potential (customer's direct mail).

Thus, the campaign 310 is a container that ties together different direct mail jobs 302. Jobs 302 grouped into the campaign 310 inherit some properties from any parent campaign by default. To model direct mail processing and be able to define specifications of the direct mail job, several types of the direct mail workflows 312 are created. They include: forms jobs, list processing jobs, personalization jobs, and open items.

List processing jobs and personalization jobs could have multiple components as a part of the specification. A list processing job may have several list processing components depending upon the number of lists to process and unique services required to perform that processing. Personalization jobs may have several personalization, mail preparation and finishing components, each one dependent upon the unique services required to perform those functions in a multi-varied direct mail production environment. When the buyer creates a direct mail specification the options are presented to the buyer based on the entered configurations and preferences.

Referring now to FIGS. 4-10, various exemplary screenshots are shown to illustrate one potential way in which the print vendor can communicate with the processor through the graphic user interface. The screenshots illustrated in FIGS. 4-10 are only examples, and those ordinarily skilled in the art would understand that many different other types of ways can be utilized to allow the user to communicate with the embodiments herein.

Figure 4:
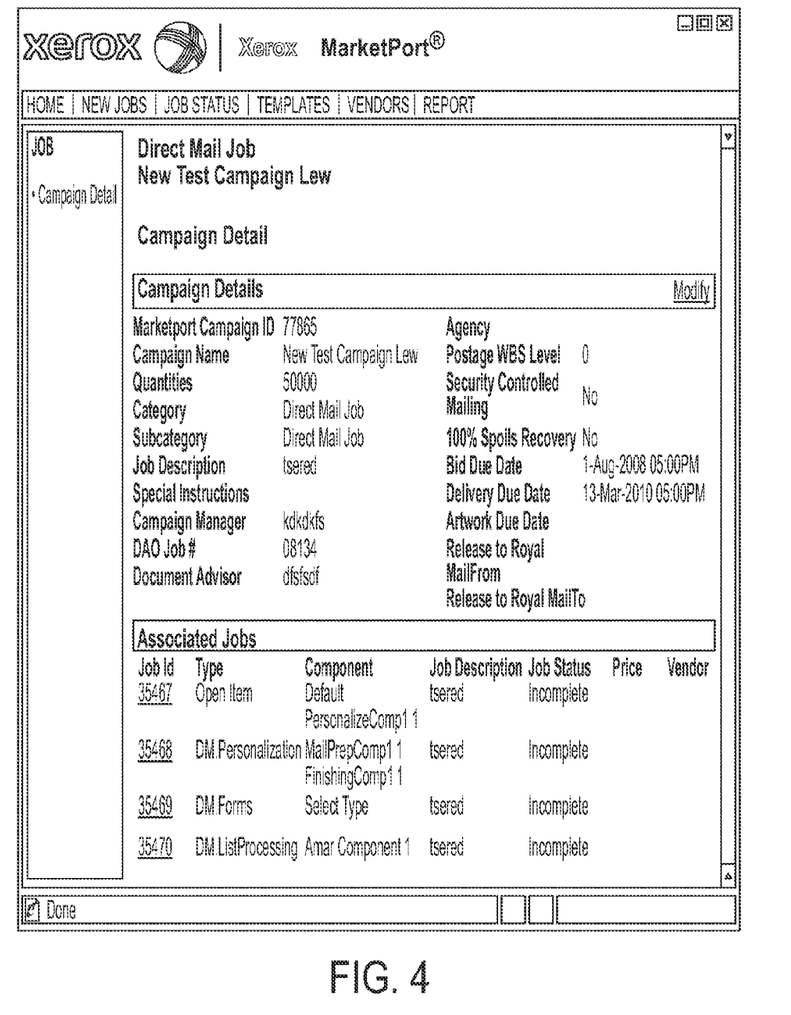
FIG. 4 is a schematic diagram of a screenshot showing potential input fields according to embodiments herein.

The buyer (printing vendor) starts the direct mail job through campaign creation using, for example, the screenshot shown in FIG. 4. Therefore, for example, this screenshot allows the user to enter or view information such as the campaign ID, campaign name, quantities, category, subcategory, job description, special instructions, campaign manager, job number, document advisor, agency, postage level, security issues, recovery information, bid due date, delivery due date, art work due date, release information, etc. This screenshot also includes information about associated jobs.

Figure 5:
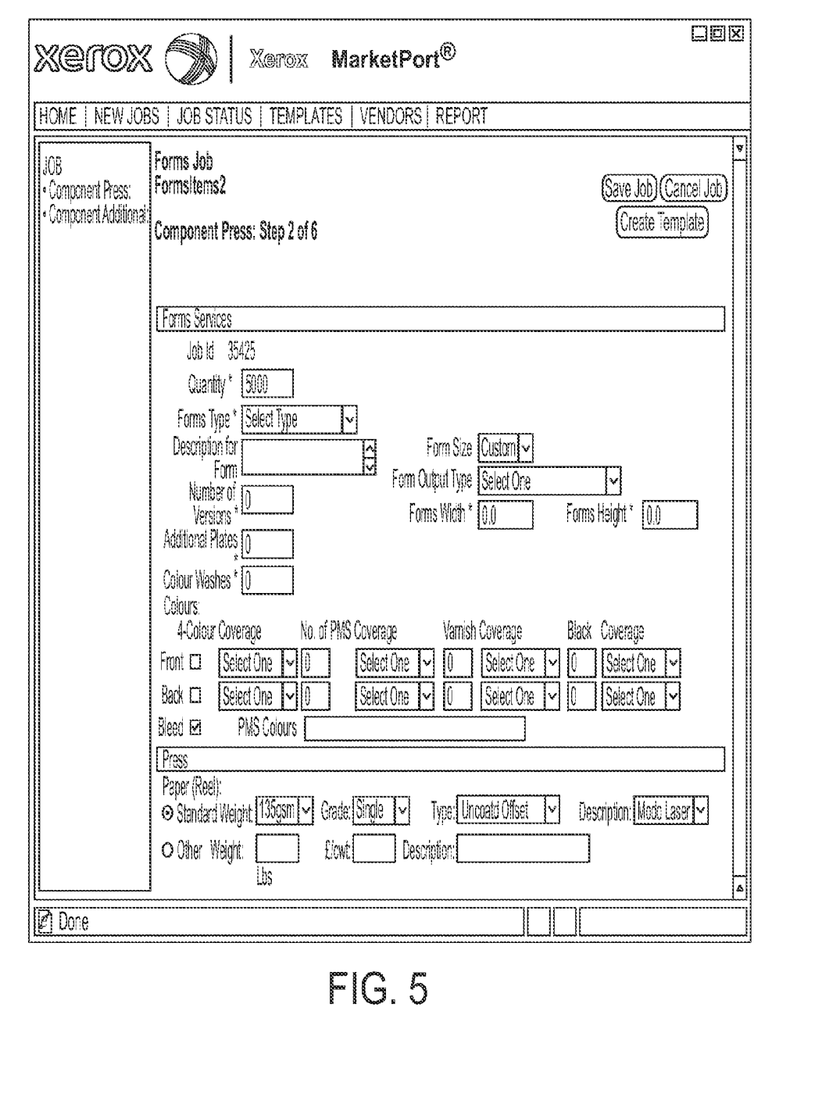
FIG. 5 is a schematic diagram of a screenshot showing potential input fields according to embodiments herein.
Figure 6:
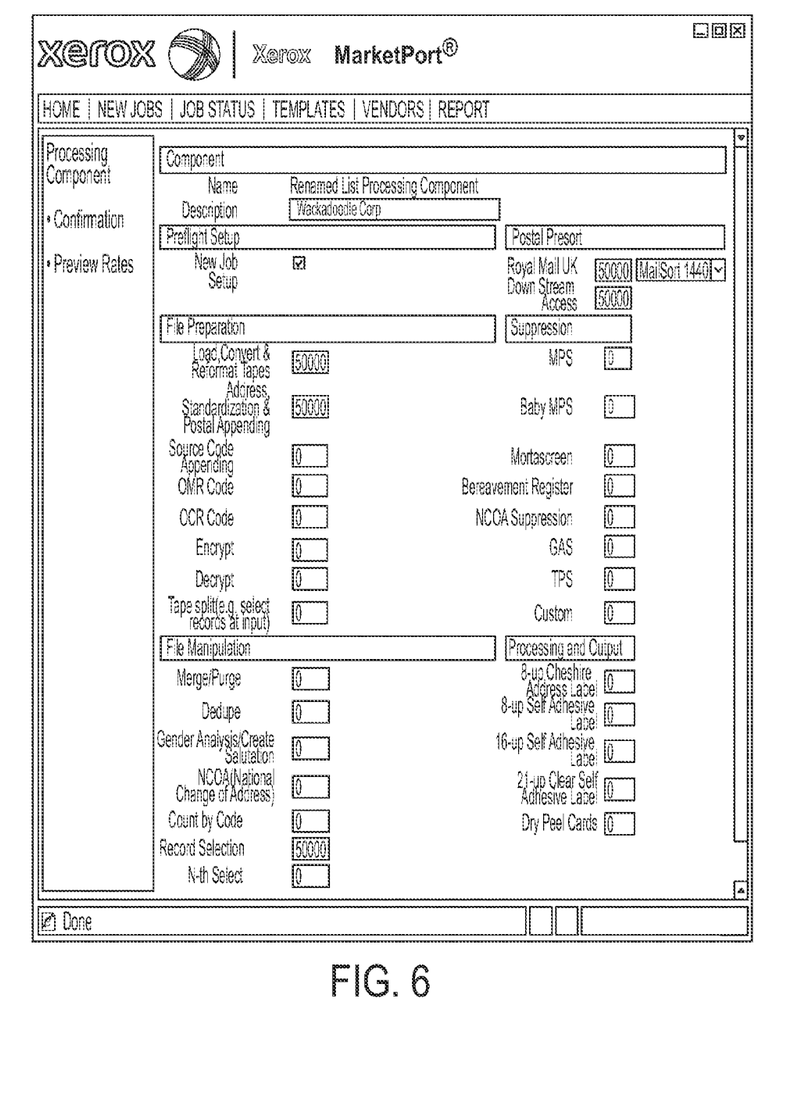
FIG. 6 is a schematic diagram of a screenshot showing potential input fields according to embodiments herein.
Figure 7:
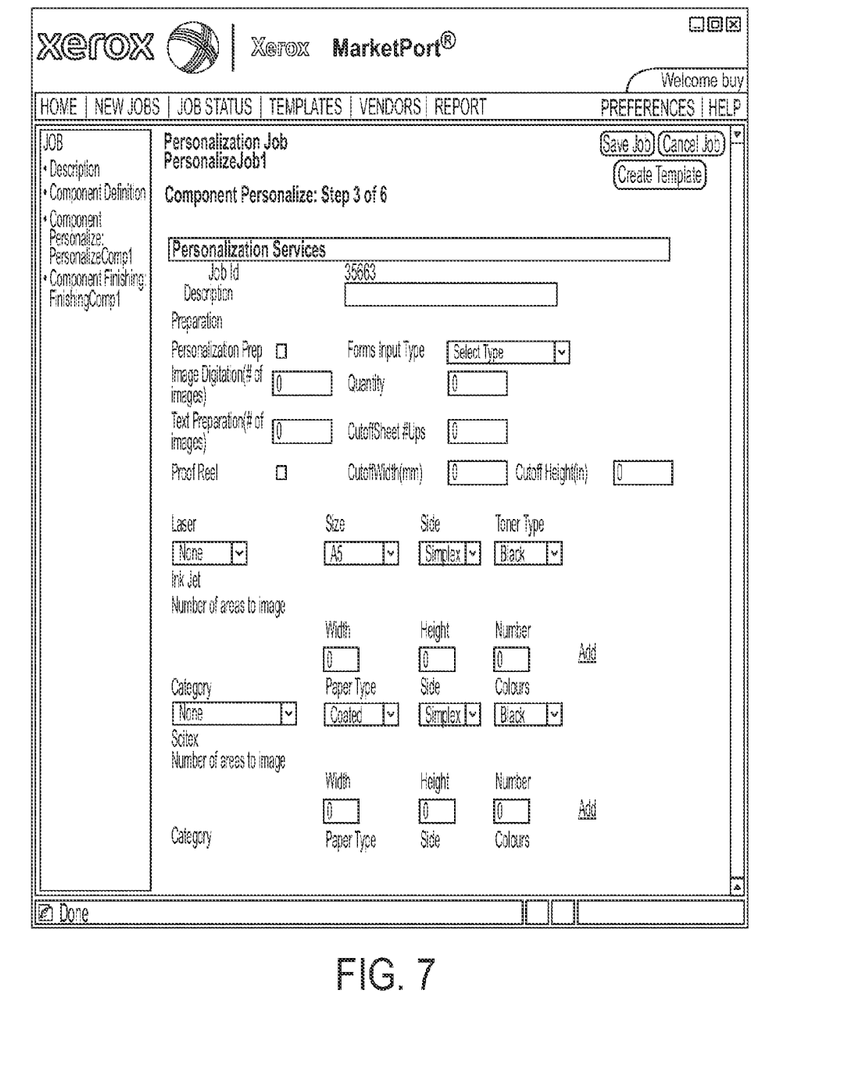
FIG. 7 is a schematic diagram of a screenshot showing potential input fields according to embodiments herein.
Figure 8:
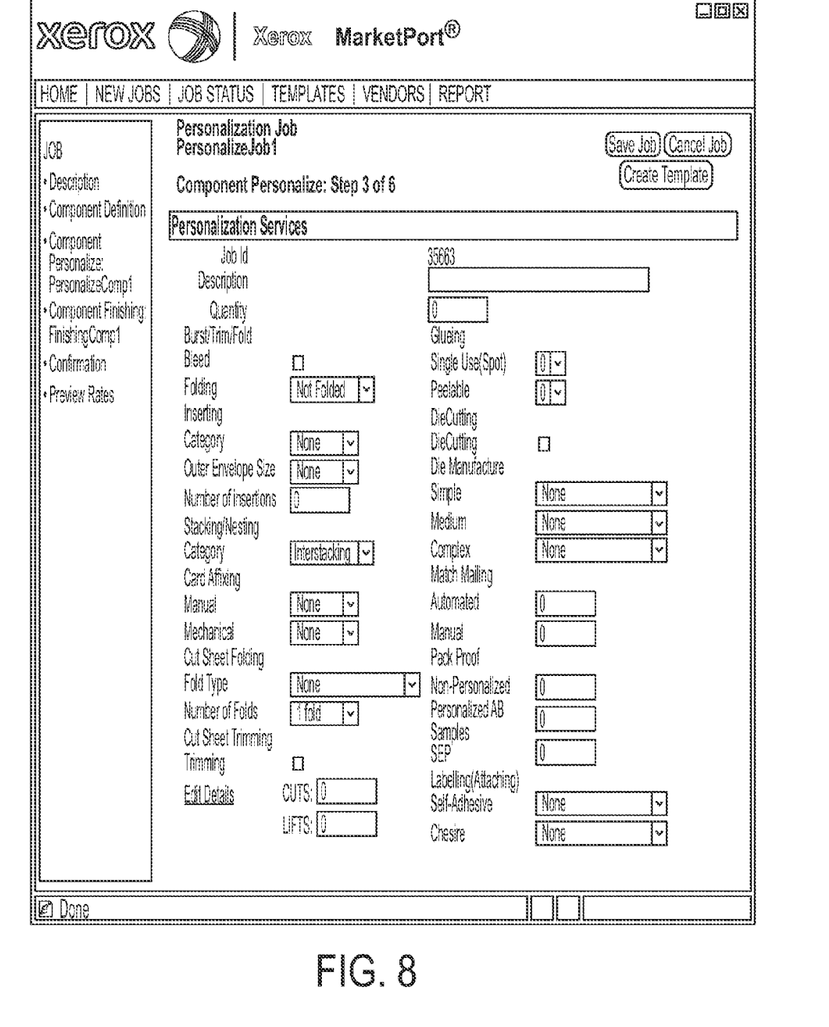
FIG. 8 is a schematic diagram of a screenshot showing potential input fields according to embodiments herein.

As a part of campaign creation the buyer could add one or more of the following jobs to the campaign:
1. Forms Jobs:
   a. Using forms job workflow the buyer can create one or more forms jobs that specify the creation of masters or other pieces for direct mail that will be processed and personalized in the manufacturing process. For example, FIG. 5 shows a potential screenshot that allows the user to input the quantity, the form type, the description for the form, the number of versions, the additional plates, the color washes, information about the different colors, the form size, the form output type, the form width, the form height, as well as press information.
   b. To source and price forms jobs, multiple forms services are created. Each service may have single or multiple pricing points.
      i. Forms services include:
         1. Forms Prepress
         2. Forms Press
         3. Forms Press Inline Operations
         4. Forms Inks
         5. Forms Paper
   c. Embodiments herein use a print type determination specific for direct mail printing to calculate the optimal print type for the job specification. First the optimal cylinder size is calculated based on the form's size, then a preview price is calculated for all supported presses, with the best press price selected.
   Press cylinder size calculation methods:
      1. Determine largest available cylinder size for total colors needed (for United Kingdom and other countries using the metric system convert inches to millimeters)
      2. Divide by flat length to get number of ups on a cutoff
      3. Run pricing calculations
      4. Repeat for next largest available cylinder size
      5. Continue until all options are calculated
      6. Select press type, number of ups and cylinder size based upon lowest priced calculation
2. List Processing Jobs:
   a. Using list processing workflow the buyer can create multiple components within a list processing job (or list processing jobs) to specify receipt of raw data files and, using multiple service options, and modify it into the proper format for personalization output. For example, the screenshot shown in FIG. 6 provides/receives information regarding the component name and description, the preflight setup, the postal pre-sorting, the file preparation, suppression, file manipulation, processing and output, etc.
      i. To source and price list processing jobs multiple list processing services are created within one or more components. Each service may have single or multiple pricing points as defined during sourcing.
         1. List processing services include:
            a. List Processing Setup
            b. File Preparation
            c. File Manipulation
            d. Postal Presort
            e. Suppression
            f. Processing and Output
            g. Custom Programming
            h. Electronic Output
3. Personalization Jobs:
   a. Using a personalization workflow, the buyer can create different components within a personalization job (or multiple personalization jobs) to specify forms personalization, finishing, and mail preparation.

i. The personalization component workflow can use multiple components to specify the placement of unique data on a master manufactured within a forms job, or supplied in a pre-manufactured state. For example, the screenshot shown in FIG. 7 allows input of (or provides) information regarding personalization services including job identification, description, personalization preparation, form input type, image digitalization, quantity, test preparation, cutoff sheet, proofing, laser, inkjet, scitex, paper category, etc.

1. To source and price personalization jobs multiple personalization services are created within a personalization component and their price points are defined during sourcing.

a. Personalization services include:
         (1) Personalization Preparation
         (2) Image Digitization
         (3) Text Preparation
         (4) Personalization Proofing
         (5) Ink Jet imaging
         (6) Laser imaging
         (7) Scitex imaging ii. The finishing component workflow can use multiple components to specify the manipulation of personalized product into individual pieces for the distribution process. For example, the screenshot shown in FIG. 8 can provide and/or receive information regarding job identification, description, quantity, burst/trim/fold, and gluing, folding, inserting, die cutting, card affixing, match mailing, cut sheet folding, packed proofing, cut sheet trimming, labeling, etc.

Figure 9:
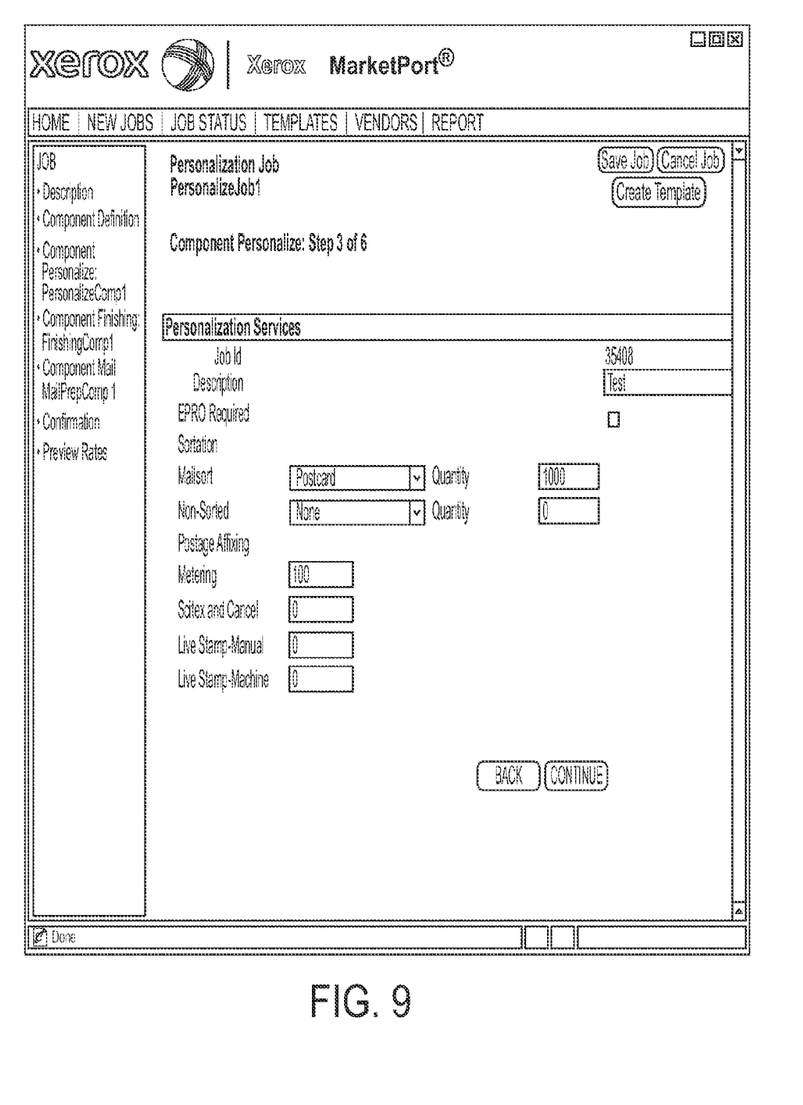
FIG. 9 is a schematic diagram of a screenshot showing potential input fields according to embodiments herein.
Figure 10:
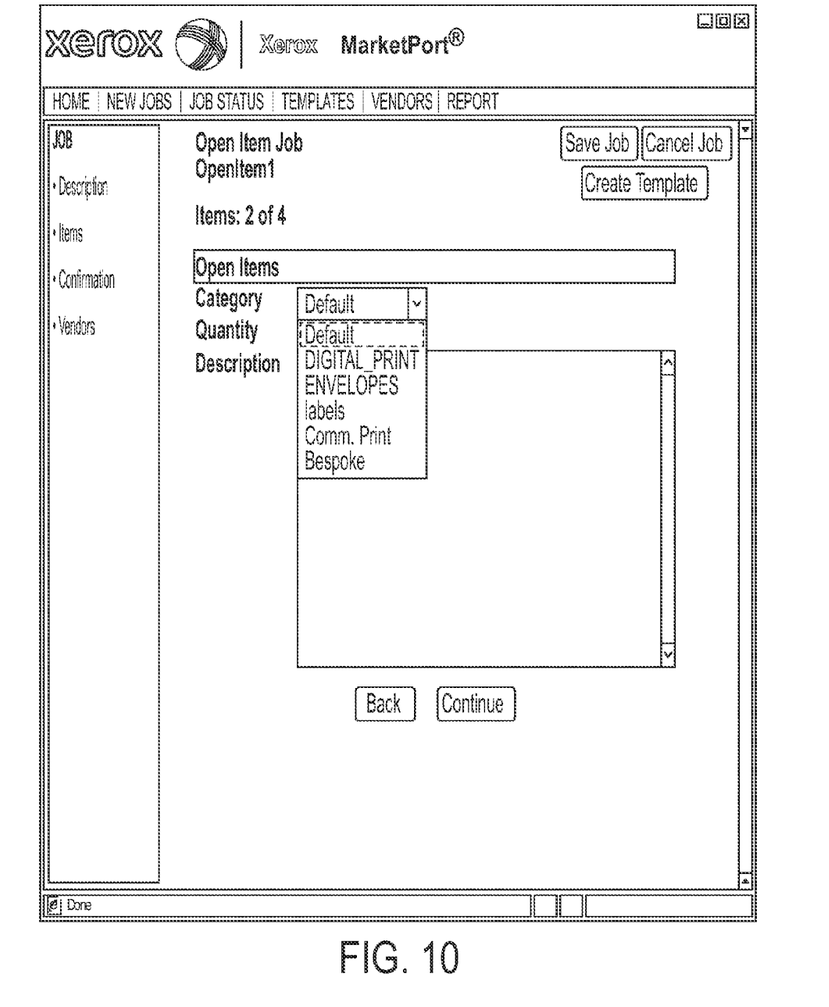
FIG. 10 is a schematic diagram of a screenshot showing potential input fields according to embodiments herein.

1. To source and price personalization jobs multiple finishing services are created within a component and their price points are defined during sourcing.

a. Finishing services include:
         (1) Burst/Trim/Fold
         (2) Inserting
         (3) Stacking
         (4) Card Affixing
         (5) Cut Sheet Folding
         (6) Cut Sheet Trimming
         (7) Gluing
         (8) Die Cutting
         (9) Die Manufacture
         (10) Match Mailing
         (11) Pack Proofs
         (12) Labeling
         (13) Mailing Security
         (14) Spoils Recovery iii. The mail preparation component workflow can use multiple components to specify the sorting, bagging and other processing of finished product for final distribution. For example, the screenshot shown in FIG. 9 illustrates the input/display of job description, sorting information, postage affixing, etc.

1. To source and price personalization jobs multiple mail preparation services are created within a mail prep component and their price points are defined during sourcing.

a. mail preparation services include:
         (1) Sorting
         (2) Postage Affixing
         (3) EPRO 4. Open Item Jobs:

a. Open item jobs can be create within a direct mail campaign for pricing of product oriented jobs without collection of the rates in the sourcing process. For example as shown in the screenshot in FIG. 10, the open item jobs information includes category, quantity, description, etc. This allows creation of specifications not currently supported in direct mail:

i. Open item jobs include digital print, commercial print, envelopes, labels, bespoke ("Custom" or "Other").

The separate direct mail organization is created to access supply vendors with direct mail capability (this could be done on the buying organization level rather than per-job level). Vendors can configure different presses (UV [Ultraviolet], Coldset, Heatset) based upon shop floor availability. When job are specified, optimization occurs upon the most economical forms press. If rates are available, the list of capable supply vendors for each direct mail job within the campaign is generated and the bidding process starts. The campaign functionality also manages information from each direct mail job about the best preview price and best vendor.

After the bidding process is completed the buyer can award each individual activity job contained within the campaign to selected supply vendors. The campaign modality allows jobs to be split among multiple capable supply vendors (with the campaign as the "sum of the whole"). Overall, the embodiments herein allow print vendors to include direct mail in the total print volume they procure for their clients and thereby achieve greater savings.

Thus, the present embodiments collect contracted rates for processes and materials and store that in a database. Conventional systems do not gather rates (contracted or otherwise). The present embodiments qualify vendors as capable both using profiles and contracted rates. The embodiments herein collect many (e.g., more than 5,000) rate datapoints, providing a highly granular qualification and qualify vendors for exact, highly-detailed job manufacturing specifications and product categories.

The rate data concept of embodiments herein generates contract pricing for each vendor without necessitating the need for vendor interaction. This is a highly unique aspect of the embodiments herein. These systems and methods generate contract pricing (a "preview price") as the starting point of the bidding process. The buyer is able to review pricing and modify specifications independently prior to placing the job out to bid. The buyer is also able to uniquely rule-out higher-priced suppliers before submitting to bid. In effect, the invention serves as an arm of the supplier's estimating and sales department, eliminating a significant amount of interaction normally required in the estimating and bidding process.

The embodiments herein are two-way. In addition to the buyer generating a job and placing out to bid, a supplier (if requested) can create a job within the application (if requested to do so via phone, or to demonstrate another manufacturing option) and submit that "quote" to the buyer.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein should not be implied or imported from any above example as limitations to any particular order, number, position, size, shape, angle, color, or material.

What is claimed is:

1. A machine-implemented method comprising:
receiving job specifications for a plurality of direct mail printing jobs from at least one user into a computerized machine;
automatically, using said computerized machine, grouping said direct mail printing jobs into at least one campaign;
automatically, using said computerized machine, creating a plurality of workflows related to direct mail printing jobs within a campaign, each of said workflows comprising a plurality of individual job activities;
after creating said workflows, automatically, using said computerized machine, transmitting requests for bids on said job activities within said workflow to entities for allowing said entities to bid on performing said job activities, said requests for bids requiring each of said entities to break their bid down into each individual job activity of said workflow;
receiving, into said computerized machine, bids on said job activities from said entities and from rate cards previously established by said entities;
receiving, into said computerized machine, user bid selection and selecting winning bids on an individual job activity-by job activity basis from said bids received from said entities and said rate cards;
automatically, using said computerized machine, combining said winning bids to provide cost and completion estimates for each of said workflows;
automatically, using said computerized machine, combining estimates for said workflows as an overall estimate for said campaign;
outputting, from said computerized machine, said overall estimate for said campaign to said user;
receiving, into said computerized machine, campaign modification input from said user in response to said overall estimate for said campaign;
modifying said campaign according to said campaign modification input through at least one iteration, using said computerized machine; and
performing said workflows to output said direct-mail printing jobs within said campaign, using said computerized machine.

2. The method according to claim 1, said workflows comprising at least one of form workflows, list processing workflows, personalization workflows, and open workflows.

3. The method according to claim 2, said form workflows comprising at least one of prepress activities, press activities, inline operation activities, ink supply activities, and paper supply activities.

4. The method according to claim 2, said list processing workflows comprising at least one of list processing setup activities, file preparation activities, file manipulation activities, postal pre-sorting activities, suppression activities, processing and output activities, custom programming activities, and electronic output activities.

5. The method according to claim 2, said personalization workflows comprising at least one of personalization preparation activities, image digitalization activities, text preparation activities, personalization proofing activities, ink jet imaging activities, laser imaging activities, scitex imaging activities, burst/trim/folding activities, inserting activities, stacking activities, card affixing activities, cut sheet folding activities, cut sheet trimming activities, gluing activities, die cutting activities, die manufacture activities, match mailing activities, packed proofing activities, labeling activities, mailing security activities, spoils recovery activities, sorting activities, postage affixing activities, and electronic production activities.

6. A machine-implemented method comprising:
receiving job specifications for a plurality of direct mail printing jobs from at least one user into a computerized machine;
automatically, using said computerized machine, grouping said direct mail printing jobs into at least one campaign;
automatically, using said computerized machine, creating a plurality of workflows related to direct mail printing jobs within a campaign, each of said workflows comprising a plurality of individual job activities;
after creating said workflows, automatically, using said computerized machine, transmitting requests for bids on said job activities within said workflow to entities for allowing said entities to bid on performing said job activities, said requests for bids requiring each of said entities to break their bid down into each individual job activity of said workflow;
receiving, into said computerized machine, bids on said job activities from said entities and from rate cards previously established by said entities;
receiving, into said computerized machine, user bid selection and selecting winning bids on an individual job activity-by job activity basis from said bids received from said entities and said rate cards;
automatically, using said computerized machine, combining said winning bids to provide cost and completion estimates for each of said workflows;
automatically, using said computerized machine, combining estimates for said workflows as an overall estimate for said campaign;
outputting, from said computerized machine, said overall estimate for said campaign to said user by identifying which bidder can perform all said workflow at a lowest cost and breaking each bid down into said individual job activity-by job activity basis;
receiving, into said computerized machine, campaign modification input from said user in response to said overall estimate for said campaign;
modifying said campaign according to said campaign modification input through at least one iteration, using said computerized machine; and
performing said workflows to output said direct-mail printing jobs within said campaign, using said computerized machine.

7. The method according to claim 6, said workflows comprising at least one of form workflows, list processing workflows, personalization workflows, and open workflows.

8. The method according to claim 6, said form workflows comprising at least one of prepress activities, press activities, inline operation activities, ink supply activities, and paper supply activities.

9. The method according to claim 7, said list processing workflows comprising at least one of list processing setup activities, file preparation activities, file manipulation activities, postal pre-sorting activities, suppression activities, processing and output activities, custom programming activities, and electronic output activities.

10. The method according to claim 7, said personalization workflows comprising at least one of personalization preparation activities, image digitalization activities, text preparation activities, personalization proofing activities, ink jet imaging activities, laser imaging activities, scitex imaging activities, burst/trim/folding activities, inserting activities, stacking activities, card affixing activities, cut sheet folding activities, cut sheet trimming activities, gluing activities, die cutting activities, die manufacture activities, match mailing activities, packed proofing activities, labeling activities, mailing security activities, spoils recovery activities, sorting activities, postage affixing activities, and electronic production activities.

11. An apparatus comprising:
a computer storage media storing instructions;
a processor operatively connected to said computer storage media, said processor performing said instructions;
a graphic user interface operatively connected to said processor, said graphic user interface receiving job specifications for a plurality of direct mail printing jobs from at least one user, said processor automatically grouping said direct mail printing jobs into at least one campaign, said processor automatically creating a plurality of workflows related to direct mail printing jobs within a campaign, each of said workflows comprising a plurality of individual job activities; and
an input-output operatively connected to said processor, said input-output automatically, after said workflows are created, transmitting requests for bids on said job activities within said workflow to entities for allowing said entities to bid on performing said job activities, said requests for bids requiring each of said entities to break their bid down into each individual job activity of said workflow, said input-output receiving bids on said job activities from said entities and from rate cards previously established by said entities,
said graphic user interface receiving user bid selection and selecting winning bids on an individual job activity-by job activity basis from said bids received from said entities and said rate cards,
said processor automatically combining said winning bids on said individual job activity-by job activity basis to provide cost and completion estimates for each of said workflows,
said processor automatically combining estimates for said workflows as an overall estimate for said campaign,
said graphic user interface outputting said overall estimate for said campaign to said user,
said graphic user interface receiving campaign modification input from said user in response to said overall estimate for said campaign,
said processor modifying said campaign according to said campaign modification input through at least one iteration, and
said processor performing said workflows to output, through said input-output, said direct-mail printing jobs within said campaign.

12. The apparatus according to claim 11, said workflows comprising at least one of form workflows, list processing workflows, personalization workflows, and open workflows.

13. The apparatus according to claim 12, said form workflows comprising at least one of prepress activities, press activities, inline operation activities, ink supply activities, and paper supply activities.

14. The apparatus according to claim 12, said list processing workflows comprising at least one of list processing setup activities, file preparation activities, file manipulation activities, postal pre-sorting activities, suppression activities, processing and output activities, custom programming activities, and electronic output activities.

15. The apparatus according to claim 12, said personalization workflows comprising at least one of personalization preparation activities, image digitalization activities, text preparation activities, personalization proofing activities, ink jet imaging activities, laser imaging activities, scitex imaging activities, burst/trim/folding activities, inserting activities, stacking activities, card affixing activities, cut sheet folding activities, cut sheet trimming activities, gluing activities, die cutting activities, die manufacture activities, match mailing activities, packed proofing activities, labeling activities, mailing security activities, spoils recovery activities, sorting activities, postage affixing activities, and electronic production activities.

16. An apparatus comprising:
a computer storage media storing instructions;
a processor operatively connected to said computer storage media, said processor performing said instructions;
a graphic user interface operatively connected to said processor, said graphic user interface receiving job specifications for a plurality of direct mail printing jobs from at least one user, said processor automatically grouping said direct mail printing jobs into at least one campaign, said processor automatically creating a plurality of workflows related to direct mail printing jobs within a campaign, each of said workflows comprising a plurality of individual job activities; and
an input-output operatively connected to said processor, said input-output automatically, after said workflows are created, transmitting requests for bids on said job activities within said workflow to entities for allowing said entities to bid on performing said job activities, said requests for bids requiring each of said entities to break their bid down into each individual job activity of said workflow, said input-output receiving bids on said job activities from said entities and from rate cards previously established by said entities,
said graphic user interface receiving user bid selection and selecting winning bids on an individual job activity-by job activity basis from said bids received from said entities and said rate cards,
said processor automatically combining said winning bids on said individual job activity-by job activity basis to provide cost and completion estimates for each of said workflows,
said processor automatically combining estimates for said workflows as an overall estimate for said campaign,
said graphic user interface outputting said overall estimate for said campaign to said user by identifying which bidder can perform all said workflow at a lowest cost and breaking each bid down into said individual job activity-by job activity basis,
said graphic user interface receiving campaign modification input from said user in response to said overall estimate for said campaign,
said processor modifying said campaign according to said campaign modification input through at least one iteration, and
said processor performing said workflows to output, through said input-output, said direct-mail printing jobs within said campaign.

17. The apparatus according to claim 16, said workflows comprising at least one of form workflows, list processing workflows, personalization workflows, and open workflows.

18. The apparatus according to claim 17, said form workflows comprising at least one of prepress activities, press activities, inline operation activities, ink supply activities, and paper supply activities.

19. The apparatus according to claim 17, said list processing workflows comprising at least one of list processing setup activities, file preparation activities, file manipulation activities, postal pre-sorting activities, suppression activities, processing and output activities, custom programming activities, and electronic output activities.

20. The apparatus according to claim 17, said personalization workflows comprising at least one of personalization preparation activities, image digitalization activities, text preparation activities, personalization proofing activities, ink jet imaging activities, laser imaging activities, scitex imaging activities, burst/trim/folding activities, inserting activities, stacking activities, card affixing activities, cut sheet folding activities, cut sheet trimming activities, gluing activities, die cutting activities, die manufacture activities, match mailing activities, packed proofing activities, labeling activities, mailing security activities, spoils recovery activities, sorting activities, postage affixing activities, and electronic production activities.

* * * * *